United States Patent [19]

Nakai

[11] 4,173,092
[45] Nov. 6, 1979

[54] RAT CAPTURING DEVICE
[75] Inventor: Tadanobu Nakai, Nara, Japan
[73] Assignee: Tokiwa Chemical Industries Limited, Osaka, Japan
[21] Appl. No.: 851,595
[22] Filed: Nov. 14, 1977
[30] Foreign Application Priority Data Apr. 7, 1977 [JP] Japan ............................ 52-43681[U]

[51] Int. Cl.² ............................................ A01M 23/18
[52] U.S. Cl. ...................................... 43/61; 292/338
[58] Field of Search ................... 43/60, 61, 66, 74; 292/DIG. 4, 259 R, 259 A, 331, 338, 339; 49/60

[56] References Cited

U.S. PATENT DOCUMENTS

| | | | |
|---|---|---|---|
| 2,087,646 | 7/1937 | Houghton | 43/61 |
| 3,931,691 | 1/1976 | McCord | 43/61 |

FOREIGN PATENT DOCUMENTS

| | | | |
|---|---|---|---|
| 128183 | 7/1948 | Australia | 43/61 |
| 630064 | 11/1927 | France | 43/66 |
| 1199911 | 12/1959 | France | 43/61 |

Primary Examiner—Nicholas P. Godici
Assistant Examiner—K. Bradford Adolphson
Attorney, Agent, or Firm—Mason, Fenwick & Lawrence

[57] ABSTRACT

An animal trap has an elongated hollow box-like housing including side walls, a bottom wall and an end wall and an open end portion; a movable closure member is mounted on a pivot shaft in one end of the housing for pivotal movement between a closed position blocking the open end of the housing and an open position to permit the passage of a rat into the interior of the housing. A latch rod is mounted in slots in the side walls for movement between an unlatching position permitting opening movement of the closure panel and a latching position preventing movement of the closure panel from its closed position so that movement of the closure member to the open position followed by return movement to its closed position by movement of a rat into the housing causes the latch rod to move to its latching position to prevent subsequent opening of the closure member.

4 Claims, 3 Drawing Figures

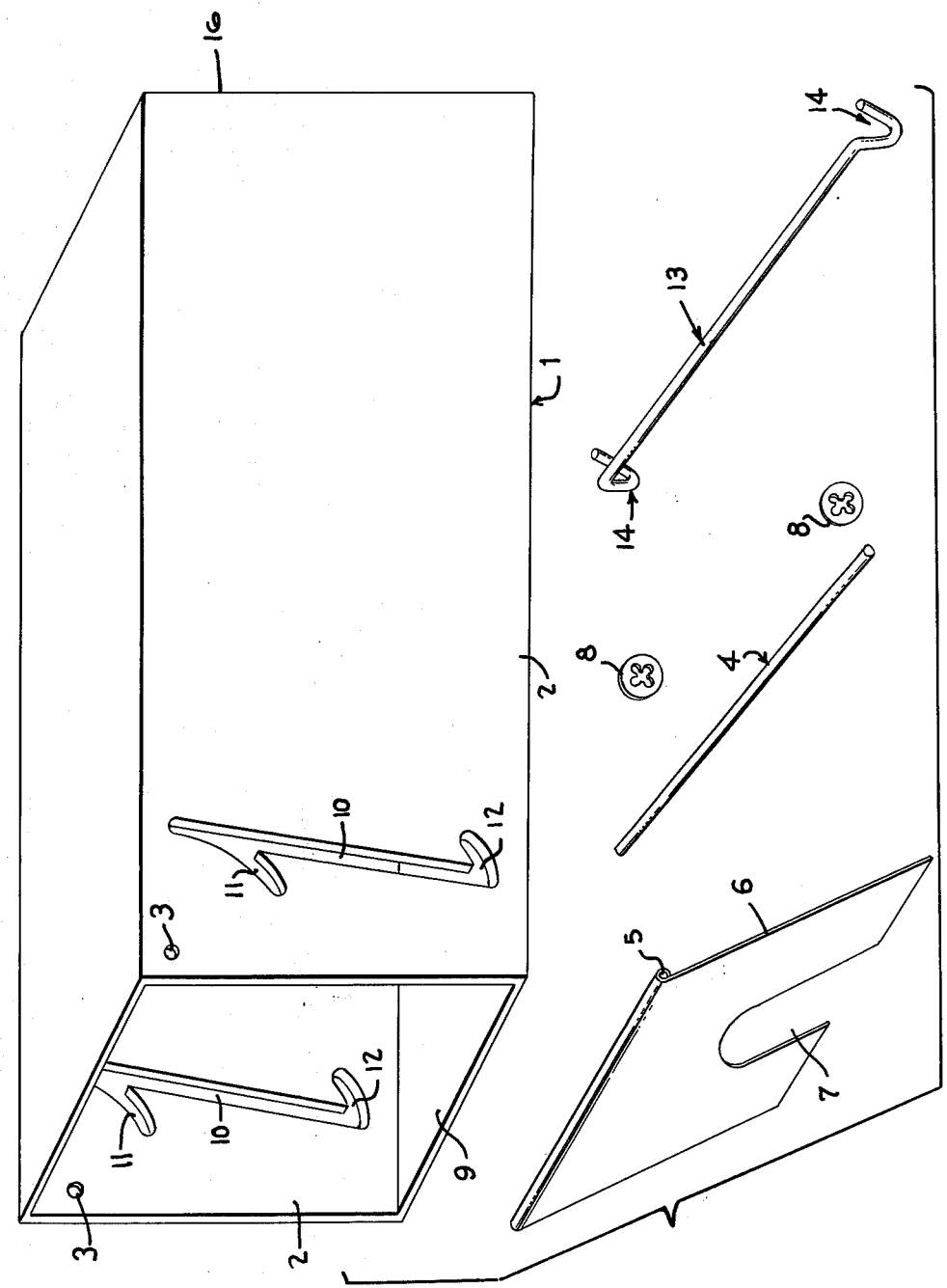

4,173,092

RAT CAPTURING DEVICE

BACKGROUND AND SUMMARY OF THE INVENTION

This invention is in the field of animal trapping means and is more specifically directed to a new and improved humane rat capturing device that is highly efficient in achieving its intended purpose yet is economical to manufacture and use.

Therefore, it is the primary object of this invention to provide a new and improved rat capturing or trapping device.

A further object of the invention is to provide a new and improved rat trap that is economical to produce and highly effective in achieving its intended purpose of trapping rats.

A better understanding of the manner in which the preferred embodiment of the invention accomplishes the objects of the invention will be enabled when the following detailed description is considered in conjunction with the appended drawings in which:

BRIEF DESCRIPTION OF THE DRAWINGS

FIG. 2 is an exploded perspective view illustrating the individual components of the preferred embodiment.

DESCRIPTION OF THE PREFERRED EMBODIMENT

Figure 1:
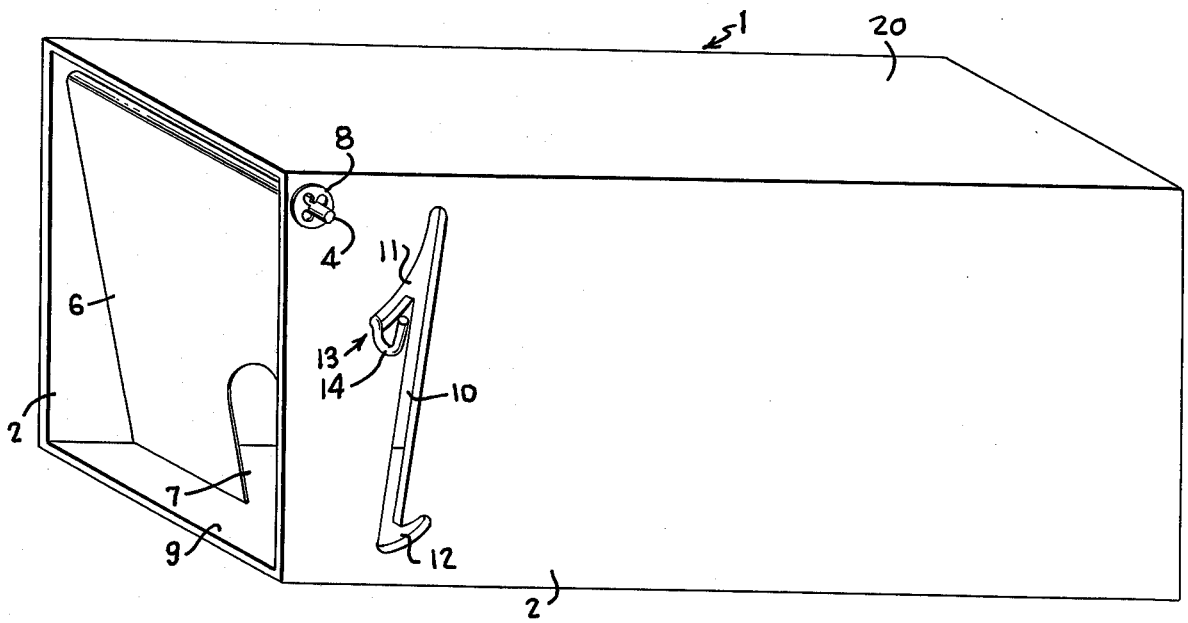
FIG. 1 is a perspective view of the preferred embodiment of the invention.

The preferred embodiment of the invention as illustrated in FIG. 1 is basically in the form of a closed box-like housing 1 consisting of a top wall 20, side walls 2, a bottom wall or floor 9 and an end wall 16 which has a ventilation opening 15.

The closed box-like housing means 1 is formed of metal, plastic or other suitable material having sufficient strength to retain a rat or other rodent contained within the housing as a result of the successful functional operation of the device. The upper left corner of both of the side walls 2 as viewed in FIGS. 1 and 2 is provided with a pivot shaft support opening 3 with the openings 3 in both walls being positioned in axial alignment with each other as best illustrated in FIG. 2, to provide support for a pivot shaft 4 which is positioned in the openings 3 in the manner shown in FIG. 1. Pivot shaft 4 is retained in position extending through the pivot shaft support openings 3 by means of conventional shaft retainer means 8 connected to the outer ends of the pivot shaft in the manner best illustrated in FIG. 1.

A movable closure 6 is formed of metal or other suitable material is provided with an elongated generally cylindrical passageway 5 along its upper edge portion through which the pivot shaft 4 extends to provide a hinged support for the closure member. Consequently, the movable closure member 6 is capable of pivotal movement about the axis of pivot shaft 4 in an obvious manner. It should be observed that the lower end of the movable closure 6 is provided with a relatively small entrance aperture 7 which is sufficiently small to prevent a rat of the type desired to be captured from passing through the entrance aperture. The arrangement is such that the movable closure means 6 is permitted a free and easy counterclockwise pivotal movement with respect to the pivot shaft 4 as viewed in FIG. 1 with the lower end edge of the movable closure normally engaging the bottom wall or floor portion 9 of the box-like housing 1. It will be observed that when the movable closure means is in the closed position of FIG. 1, it is in a canted or inclined position with respect to the bottom wall so that the geometry of the mounting of the closure member in the housing and the length of the closure member prevents the lower portion of the door from moving outwardly beyond the position illustrated in FIG. 1. In other words, the distance between the lower edge of the movable closure 6 and the pivot shaft 4 is greater than the vertical distance of the pivot shaft 4 above floor portion 9.

Latching means comprising an elongated latch bar or shaft 13 is provided for latching the pivotal closure member 6 in a closed position following entry of a rat into the housing. The latching bar is shown in the latching position in dotted lines in FIG. 3. Means for moving the latch bar from an unlocked position illustrated in solid lines in FIG. 3 to the locked dashed line position of the same figure in response to movement of the pivotal closure member 6 from the closed position to the dashed line open position and return to the closed position, as occurs upon entry of a rat into the housing 1, comprises first and second aligned wall slot means respectively provided in the side walls 2.

Each of the wall slot means comprises a slightly canted vertically extending main slot portion 10 having its lower end spaced a relatively small distance above the floor portion 9 and having its upper end spaced a relatively small distance below the top wall 20 of the housing. A downwardly and forwardly inclined upper slot portion 11 has its upper end communicating with the upper end of the main slot portion 10 and has its lower end positioned outwardly and downwardly from the upper end of the main slot portion 10; similarly, a locking slot portion 12 has its lower end communicating with the lower end of main slot portion 10 and extends upwardly and inwardly with respect to the lower end of main slot portion 10.

Figure 3:
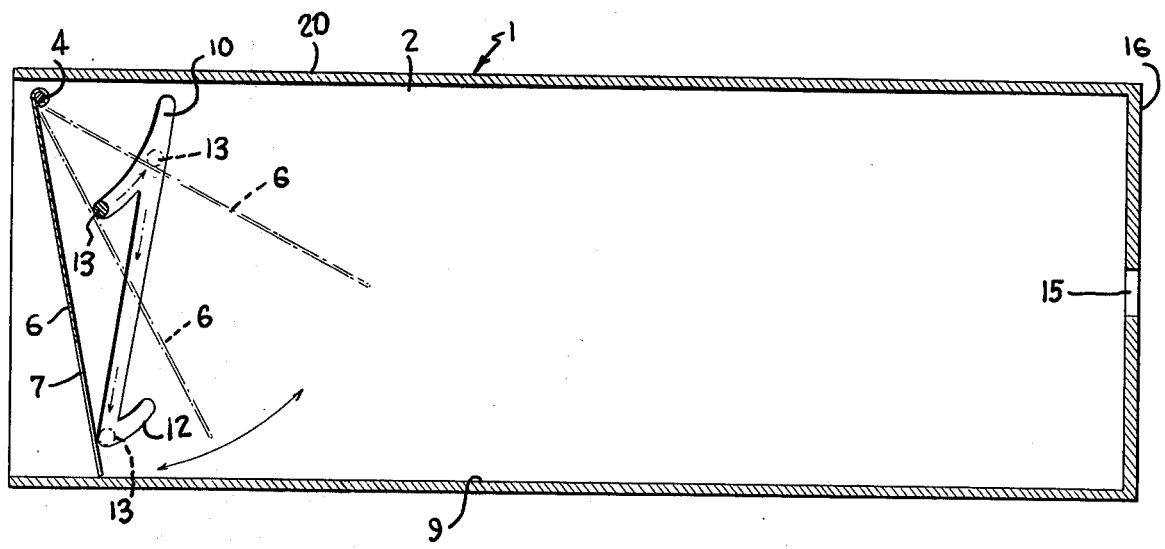
FIG. 3 is a longitudinal sectional view of the preferred embodiment of FIG. 1.

It will be seen from inspection of FIG. 2 that the latch bar or shaft 13 is provided with bent end tab portions 14 which are positioned outwardly of the side walls 2 (FIG. 1) with the latch shaft means 13 extending through the slots but being of slightly less thickness than the width of the slots so that the latch shaft is capable of movement from the upper or unlatching position illustrated in FIG. 1 to a lower or locking position illustrated in dotted lines in FIG. 3. The bent end tab portions 14 can be manually engaged to initially position the latch shaft 13 in the upper or unlatching position of FIG. 1. However, subsequent movement of the closure panel 6 to the open position followed by return movement to the closed position as occurs when a rat fully enters the housing results in movement of the latch shaft to the locked position in a manner to be described in further detail hereinafter.

In use, the device is positioned in a location in which it is desired to trap rats. The latch bar 13 is positioned in the lower end of the upper slot portion 11 with the closure means 6 closed as shown in FIG. 1. Bait can be provided on the interior of the housing 1 or the housing can be positioned with the open end over a wall opening or the like frequented by rats so that the rats will attempt to enter the housing for one reason or the other. In any event, an attempt by a rat to enter the housing through the entrance aperture 7, which is too small to permit passage of the rat, will consequently move the closure panel 6 in a counterclockwise direction as viewed in FIG. 1. Such pivotal movement of the closure panel 6 causes the latch bar 13 to move upwardly from the lower end of the upper slot portion 11 into the upper end of the generally vertical guide slot 10 as shown in dashed lines in FIG. 3. When the rat moves past the closure panel 6, the panel is then free to fall back to its closed position at which time the latch bar 13 falls downwardly along the length of the guide slot 10 to the lower locking slot portion 12. Movement of the latch bar 13 to the lower end of the vertical slot 10 prevents subsequent opening movement of the closure panel 6 since such movement will simply move the latch bar 13 to the upper end of lower slot portion 12 at which point the bar 13 will prevent further movement of the closure member so that the rat is effectively trapped within the housing 1. Moreover, any subsequent movement of the closure panel such as caused by a rat externally of the housing attempting to enter the housing results in movement of the latch shaft to the upper end of the lower end slot portion 12 at which time the closure panel is capable of no further movement. Obviously, the amount of movement of the closure panel is extremely limited and is of inadequate extent to permit a rat on the interior of the housing to escape. However, latch bar 4 can be manually engaged at tab portions 14 and lifted to the upper end of slot 10 to permit opening of closure 6 for permitting removal of the rat from housing 1.

Consequently, it will be seen that the preferred embodiment of the invention is of remarkably simple construction which can be easily manufactured but which is very effective in trapping and catching rats or other similar animals. While numerous modifications of the preferred embodiment will undoubtedly occur to those of skill in the art, it should be understood that the spirit and scope of the invention is to be limited solely by the appended claims.

I claim:

1. An animal trap comprising an elongated hollow box-like housing having first and second side walls, a bottom wall and an end wall and an open end portion, a movable closure, a pivot shaft extending between said side walls supporting said movable closure for pivotal movement about an upper portion of said closure so that said closure is movable between a closed position blocking the open end portion of said housing and an open portion to permit the passage of a rat into the interior of said housing, latch means mounted in said housing for movement between an unlatching position permitting opening movement of said closure and a latching position preventing movement of said closure from its closed position, said latch means comprising a latch shaft extending across the interior of said housing between said side walls inwardly of said closure member and latch actuator means supporting said latch means for movement from its unlatching position to its latched position in response to movement of said closure from its closed position to its open position followed by movement of said closure to its closed position and wherein said latch actuator means comprises first and second aligned wall slot means respectively provided in said side walls, the respective ends of said latch shaft being mounted in said respective wall slot means for movement therealong with each of said wall slot means comprising a main vertically extending canted slot portion having a lower end termination and an upper end termination with said upper end termination being spaced inwardly of said housing from said movable closure a greater distance than said lower end termination of said main vertically extending slot portion and wherein each of said wall slot means further includes upper and lower slot portions respectively connected to the upper and lower ends of said main vertically extending slot portion and respectively extending forwardly and rearwardly at a canted angle with respect to said main vertically extending slot portion.

2. An animal trap comprising an elongated hollow box-like housing having first and second side walls, a bottom wall and an end wall and an open end portion, a movable closure, a pivot shaft extending between said side walls supporting said movable closure for pivotal movement about an upper portion of said closure so that said closure is movable between a closed position blocking the open end portion of said housing and an open portion to permit the passage of a rat into the interior of said housing, latch means mounted in said housing for movement between an unlatching position permitting opening movement of said closure and a latching position preventing movement of said closure from its closed position, said latch means comprising a latch shaft extending across the interior of said housing between said side walls inwardly of said closure and latch actuator means supporting said latch means for movement from its unlatching position to its latched position in response to movement of said closure from its closed position to its open position followed by movement of said closure to its closed position and wherein said latch actuator means comprises first and second aligned wall slot means respectively provided in said side walls, the respective ends of said latch shaft being mounted in said respective wall slot means for movement therealong with each of said wall slot means comprising a main vertically extending canted slot portion having a lower end termination and an upper end termination with said upper end termination being spaced inwardly of said housing from said movable closure a greater distance than said lower end termination of said main vertically extending slot portion, a downwardly and forwardly inclined upper slot portion having an upper end communicating with the upper end of said main slot portion and a canted locking slot portion having a lower end communicating with the lower end of said main vertically extending slot portion and an upper end portion above and inwardly of said lower end of said main slot portion.

3. An animal trap comprising an elongated hollow box-like housing having first and second side walls, a bottom wall and an end wall and an open end portion, a movable closure, said movable closure having a lower edge termination including an entrance aperture extending upwardly from a lower horizontal edge portion, said entrance aperture being too small to permit passage therethrough of an animal desired to be trapped, means supporting said movable closure for pivotal movement about an upper portion of said closure so that said closure is movable between a closed position blocking the open end portion of said housing and an open position to permit the passage of a rat into the interior of said housing, latch means mounted in said housing for movement between an unlatching position permitting opening movement of said closure from its closed position and latch actuator means supporting said latch means for movement from its unlatching position to its latched position in response to movement of said closure from its closed position to its open position followed by movement of said closure to its closed position and said latch actuator means comprises first and second wall slot means respectively provided in said side walls wherein each of said wall slot means comprises a main vertically extending canted slot portion having a lower end termination and an upper end termination with said upper end termination being spaced inwardly of said housing from said movable closure a greater distance than said lower end termination of said main vertically extending slot portion and each of said wall slot means further includes upper and lower slot portions respectively connected to the upper and lower ends of said main vertically extending slot portion and respectively extending forwardly and rearwardly at a canted angle with respect to said main vertically extending slot portion.

4. An animal trap comprising an elongated hollow box-like housing having first and second side walls, a bottom wall and an end wall and an open end portion, a movable closure, said movable closure having a lower edge termination including an entrance aperture extending upwardly from a lower horizontal edge portion, said entrance aperture being too small to permit passage therethrough of an animal desired to be trapped, means supporting said movable closure for pivotal movement about an upper portion of said closure so that said closure is movable between a closed position blocking the open end portion of said housing and an open position to permit the passage of a rat into the interior of said housing, latch means mounted in said housing for movement between an unlatching position permitting opening movement of said closure and a latching position preventing movement of said closure from its closed position and latch actuator means supporting said latch means for movement from its unlatching position to its latched position in response to movement of said closure from its closed position to its open position followed by movement of said closure to its closed position and wherein said means supporting said movable closure for pivotal movement comprises a horizontal pivot shaft extending between upper portions of said side walls, said latch actuator means comprises first and second wall slot means respectively provided in said side walls wherein each of said wall slot means comprises a main vertically extending canted slot portion having a lower end termination and an upper end termination with said upper end termination being spaced inwardly of said housing from said movable closure a greater distance than said lower end termination of said main vertically extending slot portion, a downwardly and forwardly inclined upper slot portion having an upper end communicating with the upper end of said main slot portion and a canted locking slot portion having a lower end communicating with the lower end of said main vertically extending slot portion and an upper end portion above and inwardly of said lower end of said main slot portion, wherein the distance between the lower horizontal edge portion of said movable closure and the axis of said pivot shaft is greater than the vertical distance of said pivot shaft from said bottom wall and said lower horizontal edge portion is spaced inwardly of said housing with respect to said pivot shaft and wherein said latch shaft includes manually engageable end portions extending beyond said side walls to permit manual positioning of said latch shaft in the lower end of said upper slot portion.

* * * * *